Feb. 16, 1926.
M. FLEISCHER
1,573,696
SONG MOTION PICTURE FILM
Filed June 4, 1925
Fig. 1.
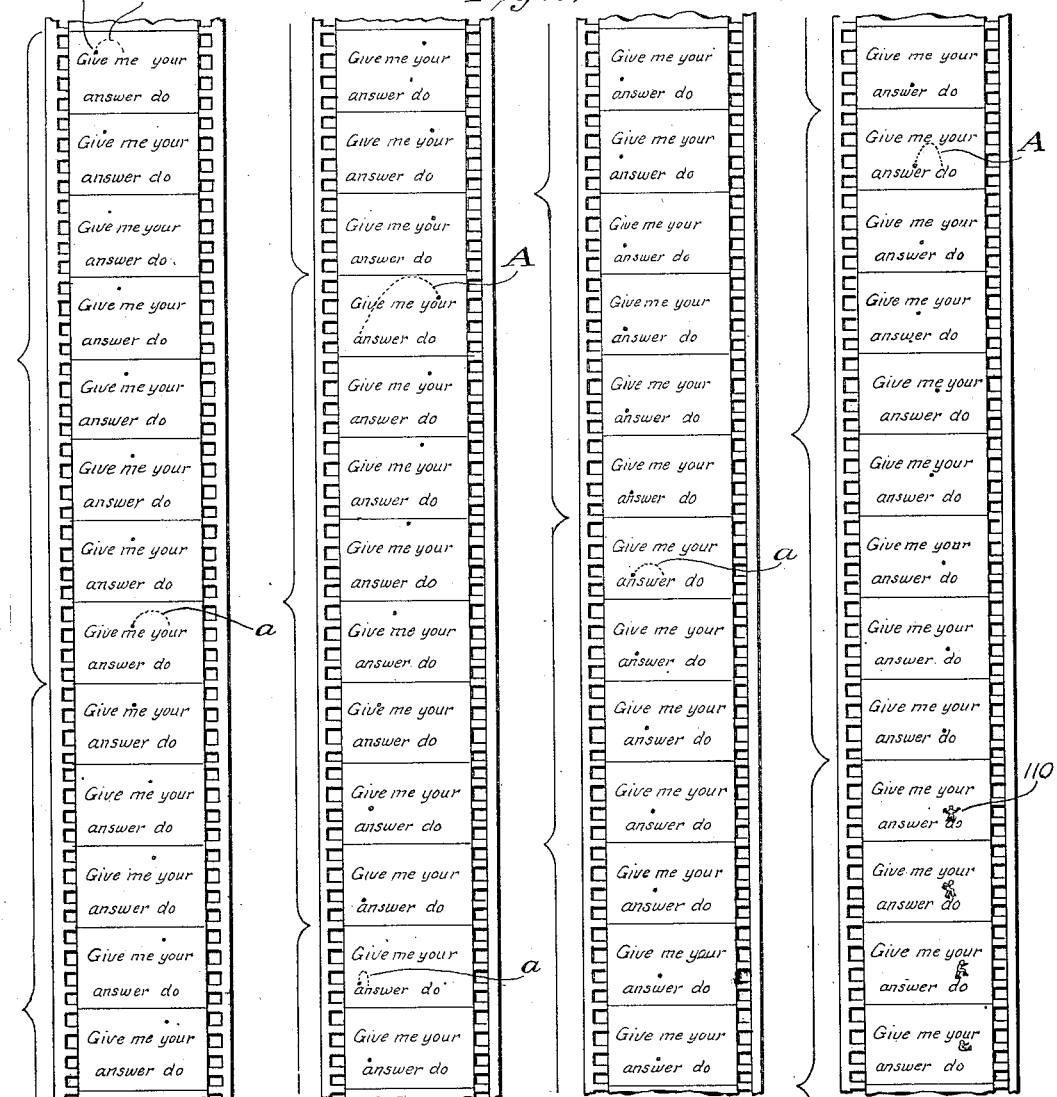
WITNESSES
INVENTOR
MAX FLEISCHER
BY
ATTORNEYS Patented Feb. 16, 1926.

1,573,696

UNITED STATES PATENT OFFICE.

MAX FLEISCHER, OF BROOKLYN, NEW YORK, ASSIGNOR TO OUT OF THE INKWELL FILMS, INC., OF NEW YORK, N. Y., A CORPORATION OF NEW YORK.

SONG-MOTION-PICTURE FILM.

Application filed June 4, 1925. Serial No. 34,990.

*To all whom it may concern:*

Be it known that I, MAX FLEISCHER, a citizen of the United States of America, and a resident of the city of New York, borough of Brooklyn, in the county of Kings and State of New York, have invented a new and Improved Song-Motion-Picture Film, of which the following is a description.

My invention relates to song motion pictures and particularly to song motion pictures having indicating means to guide the patrons of a motion picture theatre in coordinating singing with the instrumental music of a piece and to thus coordinate the singing with a projected song motion picture. Serious defects of proposed indicia and attempts to solve the problems involved in song motion pictures, are that the means employed to guide the patrons in singing with the music has been based on the idea of merely shifting the indicating mark or symbol from word to word or from syllable to syllable in the song solely in a way to indicate the separate words with a view to bring about uniformity in the singing of the words by the patrons of the motion picture theatre, which method of indicating does not take cognizance of the fact that with a number of singers there will be great variation in the starting of the singing, as well as in the singing of a particular word or syllable, not all beginning the word or syllable at the same time and not all holding the word or syllable for the same period. According to my invention the mode of singing the words and syllables of a projected song may vary on the part of the different individuals of a group attempting to sing in consonance with the words as displayed on projected motion pictures. On the other hand, in my invention, for the purpose of guiding the singers, I provide a shifting mark or symbol which gives an indication to the singers of just when one note is to end and the next note is to begin, and an indication as to when one bar of the musical composition is to end and when the next bar is about to begin. An object therefore is to introduce into song motion pictures in addition to the word indicated to be sung, an apparent general swing back and forth or up and down movement or shifting of the indicating device which furnishes singers with the rhythmic sense of the song and which proves to be more important than indicating the syllables and words in succession, whereby there is incorporated in the pictures the musical beat time and an indication of the ending and beginning of the respective bars of the music, which elements or features are lacking in previous attempts in the production of song motion pictures. It is a fact to be pointed out here that the beat time has not necessarily any close connection with the word time, because the singers may perhaps hold the word for a much shorter or longer period than the period which is actually written therefore in the music, and this period is determined chiefly by the language and the individuality of the different singers while the indicated beat time will progress in the exact rhythm of the composition as determined by the composer.

Reference is to be had to the accompanying drawings forming a part of this specification, it being understood that the drawings are merely illustrative of one example of the invention.

Figure 1 is a view of a musical staff together with a diagram indicating the theoretical path of the indicating mark or symbol in accordance with the beat time of a piece of music and in a manner to indicate as well the ending of a bar in the staff and the beginning of another bar;

Figure 2 shows in four parallel fragments, a section of a song motion picture film made in accordance with my invention;

Figure 3 is a diagrammatic view illustrating the disparity between the period of singing the words and the notes pertaining to a given portion of the song to be hereinafter referred to.

In Figure 1 is represented a musical staff written in three-quarter time, the music being for the song of which a part is "Daisy, Daisy, give me your answer do." In Figure 2 is shown for the major portion of the film, an indicating symbol in the form of a dot 10. In the latter part of the last section of the film, for the indicating symbol there is employed a moving figure 110. In a piece written for three-quarter time the film would have sixteen frames to each quarter note but conventionaly for the purpose of illustrating and keeping the drawing within convenient limits, I have indicated eight frames to each quarter note or twenty-four frames to a bar. It will be seen that from the first to the eighth frame in the first section of the film, at the left of Figure 2, the indicating mark 10 is gradually shifted from its position approximately central of and adjacent to the word "give" and toward a central position over the word "me"; such central position may be repeated as shown in the eighth frame of the first section of the film shown and the ninth frame or that frame which is the beginning of the next group of eight frames.

The diagram, Figure 1, represents the positions and path of the mark, that is to say, the dot. The diagram represents the recession of the symbol or mark from a position adjacent to a word or syllable to a gradually more remote position and then a gradual approach to a position adjacent the word or syllable. The arcuate dotted lines a at the first frame of each group of eight, indicates for the purpose of explanation the path of recession and approach of the symbol during the projection of the eight frames. At the end of a bar there is a greater amplitude of recessional movement, the mark moving to a position more remote than the degree of recession of the beats to a quarter note. Referring for example to the words "give me your" and to the three one-quarter notes represented in the bar, the positions of the mark in the diagram, Figure 1, below the words "give me your" indicate the beats to each of the quarter notes and it will be seen in the diagram that there are two curved lines of less amplitude than the third arcuate line representing the path of recession and approach as the end of the bar arrives in the playing of the music. I have indicated three arcuate paths a in the first two groups of eight frames. The third curved dotted line A represents the path or movement of greater recession between the three beats pertaining to the quarter notes relating to the words "give me your" and the next bar beginning with "an—".

In the diagram shown in Figure 3, the three quarter notes pertaining respectively to "give", "me", "your" are represented by the full-line arrows crossing the vertical lines. Each division of the section of the film shown in Figure 3, it will be seen, represents eight frames conventionally. Thus, the full-line arrows cross the eight frames and represent the duration of a quarter note. The overlapping dotted lines crossing the vertical lines represents a possible enunciation of the words by a singer and it will be seen that at the left of Figure 3 the dotted line did not start with the time beat of the quarter note nor with the first frame of the film section pertaining to the quarter note, but the fact that the singer started after the beginning of the beat time of the quarter note does not seriously affect the result nor does the fact that one word or syllable is carried by the singer from one quarter note into the second quarter note pertaining to the next word or syllable as written in the music.

The diagram, Figure 3, and reference thereto above, are given to emphasize the fact that with the beat time of the music being observed singing will be coordinated with the instrumental music irrespective of variations in the timing by the singers of the song or with the playing of the note pertaining thereto.

The symbol of the running and jumping figure 110 serves to increase the interest in the projected picture in successive frames. The position of the figure changes and its attitude also so that it appears to walk or run or jump from one position to another. It will be observed, comparing the figures, that the last one has receded from the position which is occupied adjacent the line of the words so that the figure moves as described in reference to the dot indicating symbol.

Another important phase of my invention is that in the movement or shift of the indicating mark from one word to another, there is no sudden movement from the center of one to the center of another nor any undesirable or annoying gap in the movement of the indicating mark as it appears in the projected pictures. It is to be noted that the diagram, Figure 1, shows by dotted lines a very gradual sidewise movement of the indicating mark from a position in vertical line with one letter of a word or syllable to a position slightly to the right in each shift and that the gradual shift takes account of the spaces between the words as well as the movement from letter to letter.

From the foregoing it will be obvious that the eye is unfailingly led at all times to the successive positions of the indicating dot, and it will be clear that the illusion is produced in the projected film picture of a travelling movement of the indicating mark without the annoyance, often leading to defeat of the purpose of the singer having to locate successive positions of the mark more or less remote from each other.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A song motion picture film having on successive frames thereof words of a song, and an indicating mark, said mark occupying, in certain frames of a group of frames, various lateral positions along said words, and positions indicating a recession and approach of the mark from and to the line of the words.

2. A song motion picture film having on successive frames thereof words of a song, and an indicating mark, said mark occupying, in certain frames of a group of frames, various lateral positions along said words, and positions indicating a recession and approach of the mark from and to the line of the words, the indicated recessional movement being greater adjacent the beginning of a bar to indicate the ending of one bar and the beginning of the next succeeding bar.

3. A song motion picture film having on successive frames thereof words of a song, and an indicating mark, said mark occupying, in certain frames of a group of frames, various lateral positions along said words, and positions indicating a recession and approach of the mark from and to the line of the words, said indicating mark consisting of a figure in various attitudes in the different positions occupied thereby in the respective frames.

4. A song motion picture film having on successive frames thereof words of a song, and an indicating mark showing in different lateral positions on successive frames a lateral shift of the mark along the length of each of the words represented by the several frames, and in positions adjacent the spaces between the words.

5. A song motion picture film having on successive frames thereof words of a song, and an indicating mark showing in different lateral positions on successive frames a lateral shift of the mark from word to word in several frames, as well as in positions indicating a recession from and an approach to the line of the words.

6. A song motion picture film bearing on successive frames thereof, repeats of words to be sung and having an indicating mark on the several frames, said indicating mark showing on the film adjacent to and approximately central of the given words in each frame of the film, and said mark on those frames in advance of those having the mark in the central position, bearing the mark in positions at different points in front of said central position, said mark showing also, on frames following those frames indicating said central positions, in positions on said following frames at points adjacent the successive words and gradually nearer the ends of the respective words.

7. A song motion picture film bearing on successive frames thereof, repeats of words to be sung and having an indicating mark on the several frames, said indicating mark showing on the film adjacent to and approximately central of the given words in each frame of the film, and said mark on those frames in advance of those having the mark in the central position, bearing the mark in positions at different points in front of said central position, said mark showing also on frames following the indicated central position in positions on said following frames at points adjacent the successive words and gradually nearer the ends of the respective words, the mark furthermore appearing on certain frames of the film adjacent the spaces between the words to produce the illusion of a very gradual travelling movement of the mark along and between the several words.

8. A song motion picture film having on successive frames thereof words of a song repeated on the several frames of the film, as well as an indicating mark disposed on the successive frames in such close relation adjacent the words as to give in the film as projected the illusion of a travelling indicating mark gradually moving along the individual words presented by the several frames.

9. A song motion picture film having on successive frames thereof words of a song repeated on the several frames of the film, as well as an indicating mark successively positioned on the successive frames so as to give in the film as projected the illusion of a travelling indicating mark gradually moving along the words presented by the several frames, and the mark appearing as well at the spaces between the words on those frames intervening between the frames having the mark located at the words.

10. A song motion picture film having on successive frames thereof words of a song repeated on the several frames of the film; and an indicating mark appearing on various frames in different positions along each of the words and relatively in such close juxtaposition as to produce in the projected film the illusion of a travelling movement of the mark to guide the eye unfailingly along the words of the song and from word to word without producing any material gap between two adjacent positions of the mark.

MAX FLEISCHER.